United States Patent [19]

van Konijnenburg et al.

[11] 4,143,104

[45] Mar. 6, 1979

[54] REPAIRING DAMAGED REFRACTORY WALLS BY GUNNING

[75] Inventors: Jan T. van Konijnenburg, Castricum; Johannes A. M. Butter, Heemskerk, both of Netherlands

[73] Assignee: Hoogovens Ijmuiden, B.V., Ijmuiden, Netherlands

[21] Appl. No.: 758,798

[22] Filed: Jan. 12, 1977

Related U.S. Application Data

[63] Continuation of Ser. No. 608,397, Aug. 27, 1975, abandoned, which is a continuation of Ser. No. 401,028, Sep. 26, 1973, abandoned.

[30] Foreign Application Priority Data

Oct. 9, 1972 [NL] Netherlands ................. 7213626

[51] Int. Cl.$^2$ .................................. F27D 1/16
[52] U.S. Cl. ................................. 264/30; 106/68; 106/69; 106/73.6; 264/36
[58] Field of Search ................. 264/30, 36; 106/69, 106/68, 73.6

[56] References Cited

U.S. PATENT DOCUMENTS

| 2,809,126 | 10/1957 | Murphy | 264/30 |
| 2,968,083 | 1/1961 | Lentz | 264/30 |
| 3,490,930 | 1/1970 | Martinet | 106/59 X |
| 3,641,229 | 2/1972 | Lawrence | 264/87 X |

FOREIGN PATENT DOCUMENTS 1171323  5/1964  Fed. Rep. of Germany.
 621092  4/1949  United Kingdom.

Primary Examiner—Thomas P. Pavelko
Attorney, Agent, or Firm—Stevens, Davis, Miller & Mosher

[57] ABSTRACT

A method of repairing refractory walls, especially coke-oven walls is disclosed. The invention utilizes a refractory repair material selected in accordance with the wall to be repaired and not less than 5.5 nor more than 20% binder. The repair material is sprayed onto a hot wall to be repaired and the binder adheres thereto by sintering with at least the boundary surfaces of the binder undergoing vitrification.

1 Claim, No Drawings

REPAIRING DAMAGED REFRACTORY WALLS BY GUNNING

This is a continuation of application Ser. No. 608,397 filed Aug. 27, 1975, now abandoned which in turn is a continuation of application Ser. No. 401,028 filed Sept. 26, 1973, now abandoned.

This invention relates to a method for repairing damaged refractory walls in which a gunning composition is gunned onto the damaged locations, and also to a refractory gunning composition which is suitable for use in such a process. In this specification the invention will mainly be discussed and explained with reference to its application in the repair of cracked coke oven walls, though the invention is not restricted thereto.

A well known problem with coke-ovens of the type containing horizontal coking chambers separated by heating chambers, is that defects, mainly cracks, appear in the refractory separating walls (which are generally constructed from silica-bricks). The cracks not only result in poor coke quality and an increase in the coking time and render the process difficult to control, but also cause various other disadvantages. Particularly, the emission of heavily polluted smoke from the chimney connected to the heating chambers must be mentioned, since it is highly detrimental to the environment. Another serious disadvantage lies in rapid wear of the furnace frames, which become too hot if refractory material near the furnace frame is lacking. This wear results in leakage of the doors. All these defects also result in a loss of by-products from the coke-oven gas.

Hitherto many attempts have been made to repair cracks in the separating walls. Because the separating walls made from silica-bricks should preferably be kept at elevated temperatures, investigations have been consistently directed to the finding of a composition which, after emptying of the chambers, can be gunned onto the hot wall. As a rule there are used compositions which consist mainly of a mortar which has been diluted with water and which itself mainly consists of sand and clay. In view of the unsatisfactory results achieved at first, investigations have been made to find a material with better lasting qualities. It was found that such a material should have dry shrinkage properties which correspond with those of the original material of the wall. If this is not the case the gunned material will loosen from the crack upon any change of the temperature of the wall. Also the repair material should adhere favourably to the original material of the separating wall, in order that during emptying or filling of the chambers cracks are not formed by mechanical shocks. Known repair materials have also suffered from the disadvantage that the repaired zone is too porous, thus permitting continued leakage of gas to the heating chamber.

We consider it desirable that a high-quality gunning composition should satisfy the following requirements:
pl the composition should be easily applied, whereas after application it should not flow away;

it should adhere well to the original material of the wall and it should have expansion properties corresponding to those of the original material;

it should be strong, in order to achieve a long life for the repaired wall, and yet should remain flexible at elevated temperatures, in order to adapt to movements in the wall; and it should preferably have low gas permeability so that at the repaired zone gas leakage is prevented or minimized.

Embodiments of the present invention may be provided which in principle fulfill these desiderata.

According to the invention, we provide a method of repair of a damaged refractory wall wherein a gunning composition is applied to the damaged wall portion or portions while the said portion or portions are at elevated temperatures, the dry component of the composition containing:

a. not less than 70% and not more than 88% of a refractory granular material of a composition which is selected in accordance with the composition of the main component of the refractory wall, b. not less than 5.5% and not more than 20% of a binder which, at the surface temperature of the wall portion being repaired, adheres by sintering to the wall and to the said refractory granular material, the binder under the conditions vitrifying at at least the boundary surfaces, the binder further containing a melting point-reducing component.

The refractory granular material should have a composition which corresponds to or is similar to that of the main component of which the wall consists.

In practice separating walls are repaired at temperatures between 400° and 1000° C. though on occasions the temperature of the wall can go down beneath 400° C. Because of the vitrification of the binder at the surface-temperature of the wall a high compactness of the material may be obtained as well as an improved sealing against gas-leakage. Flexibility at elevated temperatures should be incorporated in the material according to the invention by the addition of the melting point-reducing component, which should, however, not be added in such large quantities that the composition flows out of the repaired crack.

Suitable materials for the binder are the carbonates and borates of the metals of the group comprising Na, K and Li, and mixtures thereof. These binder materials attach satisfactorily to most of the superior refractory materials and in particular to silica. They sinter at temperatures beneath 1000° C., and thereby can form chemical compositions with the material of the wall. Typical examples of binder materials are borax, sodium tetraborate, lithium carbonate and soda.

It should be regarded as highly important that the gunning composition has good gunning properties and can be easily transported, yet it should not be of too low viscosity so that it flows away aftr having been applied. It is clear that these two requirements seem to be opposite to each other, which makes it difficult to find an optimal solution. Good results however, may be obtained by diluting the composition to a gunning mortar by admixing about 30% water, and by at the same time adding a colloidal thickener, which causes the mass to have a rheological (structure-viscous) character with a residual sheering tension (at zero velocity) of more than 4 $N/m^2$ Newton-force per square meter. The sheering tension in a viscous fluid can be measured at gradients of the velocity. By reducing said gradient to zero in ordinary Newtonian fluids the sheeting tension will also drop to zero. With rheological compositions at zero velocity sheering tension remains comparable to that of elastic solid bodies. As a colloidal thickener, clay may be added in a quantity of between 0% and 8%, preferably a clay of the bentonite type.

As has been previously explained it is desirable that the gunned mass is sufficiently flexible at elevated temperatures to adapt to movements of the cracks, and that it at the same time is sufficiently compact that no leakage of gas may occur. With the aim of achieving these requirements, a melting point-reducing component may be added up to 8%, consisting of at least one of the materials in the group consisting of pulverised glass; clay; lime and waterglass.

The sieve analysis of the solid substance of the composition, and particularly of the refractory component of it, is of great importance in determining suitability for gunning, the adhesion and the porosity of the composition. Good results may be obtained if the composition is substantially of grain-size less than 1.5mm, at least 80% being of grain size smaller than 0.5mm. and more than 50% having grain dimensions between 0.06 and 0.5mm.

More particularly in the repair of coke-oven walls good results may be obtained when the composition is gunned onto the damaged zones if it contains about 30% water, and the remainder is solid material containing:

75 to 80% $SiO_2$ (Cristobalite or Trydimite)

7 to 12% Borax ($Na_2B_4O_7 \cdot 10 H_2O$)

4 to 8% pulverised window glass 5.5 to 10% bentonite

The invention also provides a gunning composition to be used in the repair of a damaged refractory wall when mixed with water, preferably about 30% water, the composition when dry containing the following:

a. not less than 70% and not more than 88% of a fine grained refractory material which is selected from the group consisting of $SiO_2$, $MgO$, $Al_2O_3$, burned dolomite, fireclay, and mixtures thereof;

b. Not less than 5.5% and not more than 20% of a binder material which vitrifies between 200° C. and 1000° C., and consists of at least one carbonate or borate of at least one of the metals in the group consisting of Na, K and Li;

c. not more than 8% of a melting point-reducing component which is at least one of the materials in the group consisting of pulverised glass, clay, lime and waterglass;

d. optionally, not more than 10% of a colloidal thickener, preferably bentonite (this component may be added as the composition is prepared for gunning).

A fireclay lining is often used as a furnace lining in locations where the surface-temperature can go up to about 1400° C. From the above it will be clear that in such a case a repair composition of which the refractory component consists of fireclay grains is to be preferred. In that case the same binders and melting point-reducing components as have been described above for application on coke-oven walls may be used. It will be clear that in this case, in determining the quantities of the binder and the melting point-reducing component, it should be borne in mind that the sintering and the vitrification are only needed at higher temperatures. Similar remarks can be made in connection with furnaces that are lined with burned magnesite or dolomite, which as a rule will be the case if furnaces are heated up to temperatures of about 1650° C. In the latter case as a rule a burned magnesite as the refractory component in the repair composition will be satisfactory, and as a melting point-reducing component $SiO_2$ or $CaO$ can be used.

It can be seen from the above that in the process provided by the invention, it is possible to use a water-diluted and relatively slack mortar of the specified composition, which therefore can be rather easily transported, but has a rheology (structural viscosity) which prevents the mortar from sagging while in stationary condition. The properties of thermal expansion of the repair material should be adapted to those of the wall by the selection of the refractory component, which should correspond to the one of the wall itself, and other requirements which the mass should satisfy are to be obtained by a proper selection of a binder.

What we claim is:

1. A method for repairing a damaged coke-oven wall comprising applying a gunning composition containing about 30% water and the remainder being solid material containing 75 to 80% $SiO_2$ as Cristobalite or Trydenite, 7 to 12% Borax ($Na_2B_4O_7 \cdot 10 H_2O$) as a binder, 4 to 8% ground window glass and 5.5 to 10% Bentonite to the damaged wall portion or portions while the said portion or portions are at elevated temperatures and vitrifying the binder on contact with the wall portion or portions at at least the boundary surfaces, said composition being selected in accordance with the composition of the main component of the refractory wall.

* * * * *